United States Patent
Zhang

(10) Patent No.: US 10,584,050 B2
(45) Date of Patent: Mar. 10, 2020

(54) COMPOSITE FILTER CARTRIDGE

(71) Applicant: MIDEA GROUP CO., LTD., Foshan (CN)

(72) Inventor: Xingzhi Zhang, Foshan (CN)

(73) Assignee: MIDEA GROUP CO., LTD., Foshan (CN)

( * ) Notice: Subject to any disclaimer, the term of this patent is extended or adjusted under 35 U.S.C. 154(b) by 126 days.

(21) Appl. No.: 15/863,678

(22) Filed: Jan. 5, 2018

(65) Prior Publication Data

US 2018/0127294 A1  May 10, 2018

Related U.S. Application Data

(63) Continuation of application No. PCT/CN2017/085596, filed on May 23, 2017.

(30) Foreign Application Priority Data

Oct. 26, 2016  (CN) .......................... 2016 1 0969650
Oct. 26, 2016  (CN) ...................... 2016 2 1175806 U

(51) Int. Cl.
C02F 1/28       (2006.01)
C02F 1/44       (2006.01)
(Continued)

(52) U.S. Cl.
CPC ............... C02F 9/00 (2013.01); B01D 15/00 (2013.01); C02F 1/003 (2013.01); C02F 9/005 (2013.01);
(Continued)

(58) Field of Classification Search
CPC .......... C02F 1/003; C02F 1/281; C02F 1/283; C02F 1/44; C02F 1/441; C02F 1/444;
(Continued)

(56) References Cited

U.S. PATENT DOCUMENTS 4,909,937 A    3/1990  Hoffman et al.
4,992,170 A *  2/1991  Menon ................... B01D 61/08
                                          210/321.78
(Continued)

FOREIGN PATENT DOCUMENTS

CN        203683258 U      7/2014
CN        204779100 U     11/2015
(Continued)

OTHER PUBLICATIONS

Midea, International search report and written opinion, PCT/CN 2017085596, dated Aug. 25, 2017, 16 pgs.
(Continued)

*Primary Examiner* — Matthew O Savage
(74) *Attorney, Agent, or Firm* — Morgan, Lewis & Bockius LLP

(57) ABSTRACT

A composite filter-cartridge, a composite filter-cartridge assembly for a water purifier and a water purifier are provided. The composite filter-cartridge includes a pretreatment filter-cartridge, a fine filtration filter-cartridge and an activated carbon filter-cartridge arranged sequentially from outside to inside. The fine filtration filter-cartridge includes a first water collecting pipe and a fine filtration membrane. The activated carbon filter-cartridge includes: a second water collecting pipe, an outer circumferential wall of the second water collecting pipe except a lower end thereof and an inner circumferential wall of the first water collecting pipe being spaced apart from each other; and a activated carbon, lower ends of the activated carbon and the second water collecting pipe being in sealed connection, a water outlet hole being formed in the activated carbon and penetrating the activated carbon axially, and an upper end of the water outlet hole being closed.

8 Claims, 2 Drawing Sheets

(51) Int. Cl.
- *C02F 1/52* (2006.01)
- *C02F 9/00* (2006.01)
- *C02F 1/00* (2006.01)
- *B01D 15/00* (2006.01)
- *B01D 61/04* (2006.01)
- *B01D 27/14* (2006.01)
- *B01D 61/08* (2006.01)
- *C02F 101/12* (2006.01)
- *C02F 101/30* (2006.01)
- *C02F 101/32* (2006.01)

(52) U.S. Cl.
CPC ............ *B01D 27/148* (2013.01); *B01D 61/04* (2013.01); *B01D 61/08* (2013.01); *B01D 2311/04* (2013.01); *B01D 2311/06* (2013.01); *B01D 2311/2626* (2013.01); *B01D 2311/2649* (2013.01); *B01D 2313/04* (2013.01); *B01D 2313/21* (2013.01); *B01D 2313/44* (2013.01); *C02F 1/281* (2013.01); *C02F 1/283* (2013.01); *C02F 1/44* (2013.01); *C02F 1/441* (2013.01); *C02F 1/52* (2013.01); *C02F 1/5245* (2013.01); *C02F 2101/12* (2013.01); *C02F 2101/308* (2013.01); *C02F 2101/322* (2013.01); *C02F 2201/003* (2013.01); *C02F 2201/004* (2013.01); *C02F 2201/006* (2013.01); *C02F 2301/08* (2013.01); *C02F 2303/02* (2013.01); *C02F 2307/10* (2013.01)

(58) Field of Classification Search
CPC .. C02F 1/52; C02F 1/5245; C02F 9/00; C02F 9/005; C02F 2201/003; C02F 2201/006; C02F 2101/12; C02F 2101/308; C02F 2101/322; C02F 2301/08; C02F 2303/02; B01D 15/00; B01D 61/04; B01D 61/08; B01D 2311/2649; B01D 2311/04; B01D 2313/44; B01D 2311/44

See application file for complete search history.

(56) References Cited

U.S. PATENT DOCUMENTS

| | | | |
|---|---|---|---|
| 5,078,876 A * | 1/1992 | Whittier | B01D 61/08 210/294 |
| 2004/0206682 A1* | 10/2004 | Hamlin | B01D 19/0031 210/321.6 |
| 2005/0051494 A1 | 3/2005 | Na et al. | |

FOREIGN PATENT DOCUMENTS

| | | |
|---|---|---|
| CN | 205287841 U | 6/2016 |
| CN | 205528180 U | 8/2016 |
| CN | 206156891 U | 5/2017 |

OTHER PUBLICATIONS

Midea Group Co. Ltd., Extended European Search Report, EP17743233.3, dated Oct. 9, 2019, 8 pgs.

* cited by examiner

COMPOSITE FILTER CARTRIDGE

PRIORITY CLAIM AND RELATED APPLICATION

This application is a continuation application of PCT/CN2017/085596, entitled "COMPOSITE FILTER-CARTRIDGE, COMPOSITE FILTER-CARTRIDGE ASSEMBLY FOR WATER PURIFIER AND WATER PURIFIER" filed on May 23, 2017, which claims priority to Chinese Patent Application No. 201621175806.5, filed with the State Intellectual Property Office of the People's Republic of China on Oct. 26, 2016, and entitled "COMPOSITE FILTER-CARTRIDGE, COMPOSITE FILTER-CARTRIDGE ASSEMBLY FOR WATER PURIFIER AND WATER PURIFIER", and Chinese Patent Application No. 201610969650.6, filed with the State Intellectual Property Office of the People's Republic of China on Oct. 26, 2016, and entitled "COMPOSITE FILTER-CARTRIDGE, COMPOSITE FILTER-CARTRIDGE ASSEMBLY FOR WATER PURIFIER AND WATER PURIFIER", all of which are incorporated herein by reference in their entirety.

TECHNICAL FIELD

The present disclosure relates to a field of water purification, and especially to a composite filter-cartridge, a composite filter-cartridge assembly for a water purifier, and a water purifier.

BACKGROUND

In the related art, water purification equipment such as a water purifier usually adopts a water purifying system constituted by a filter cartridge of multiple stages with a single function for each stage, in which a PP cotton (i.e. an artificial chemical fiber made of polyester fiber), an activated carbon and the like serve as a pre-filter cartridge, RO membrane (RO is an abbreviation of reverse osmosis, and RO membrane is a reverse osmosis membrane, a pore size of which is as small as a nanometer level. Under a certain pressure, water molecules can pass through the RO membrane, but inorganic salts, heavy metal ions, organic matters, colloids, bacteria, viruses and other impurities cannot pass through the RO membrane, so that pure water able to pass and waste water unable to pass are strictly separated) is connected in series, and a post activated carbon is provided, so as to purify and treat the water. However, the whole water purifying system has complicated pipelines and a large outline demission, which is inconvenient for mounting and changing parts and components, and has a high risk of water leakage when a plurality of joints are used for connection. More importantly, service lives of filtering materials in the multi-stage filter cartridge are inconsistent, for example, the service life of the PP cotton is 3 months, the service life of the activated carbon is 6 months, and the service of the RO membrane is 24 months, such that a user needs to replace 3 to 5 stages of the filter cartridge. In addition, the replacement time is difficult to master and a professional installer is required for changing the filter cartridge, thus causing bad user experience and a high comprehensive cost.

Moreover, the water purifier in the prior art mainly has small flux, and thus has the following disadvantages: (1) the water in a pressure tank cannot be discharged completely, and if the water purifier is idle for a long term, the water in the pressure tank contacts a rubber gasbag, and will go bad and produce odor; (2) the water yield is limited, when a large quantity of water is required and the water in the pressure tank runs out, it is necessary to stop using the water purification equipment for a period of time and re-fill the pressure tank to ensure a large yield of water; (3) the pressure tank is outside the water purifier and occupies more kitchen space.

SUMMARY

The present disclosure aims to solve one of the technical problems existing in the prior art. Thus, one objective of the present disclosure is to provide a composite filter-cartridge having a smaller volume and a less amount of work for changing the filter cartridge, with which the taste of outflow water can be adjusted and high water flux can be realized.

Another objective of the present disclosure is to provide a composite filter-cartridge assembly having the above composite filter-cartridge.

A further objective of the present disclosure is to provide a water purifier having the above composite filter-cartridge assembly.

The composite filter-cartridge according to a first aspect of the present disclosure includes a pretreatment filter-cartridge, a fine filtration filter-cartridge and an activated carbon filter-cartridge. The fine filtration filter-cartridge includes a first water collecting pipe and a fine filtration membrane; a plurality of water collecting holes are formed in a side wall of the first water collecting pipe; the fine filtration membrane is fitted over an outside of the first water collecting pipe and covers the plurality of water collecting holes; a separating plate is provided to an upper portion of the first water collecting pipe; the activated carbon filter-cartridge is disposed inside the first water collecting pipe. The activated carbon filter-cartridge includes: a second water collecting pipe and an activated carbon. The second water collecting pipe is disposed inside the first water collecting pipe; an upper end face of the second water collecting pipe and a lower surface of the separating plate are spaced apart from each other; and an outer circumferential wall of the second water collecting pipe except a lower end thereof and an inner circumferential wall of the first water collecting pipe are spaced apart from each other; lower ends of the second water collecting pipe and the first water collecting pipe are in sealed connection. The activated carbon is disposed inside the second water collecting pipe; an outer circumferential wall of the activated carbon except a lower end thereof and an inner circumferential wall of the second water collecting pipe are spaced apart from each other; lower ends of the activated carbon and the second water collecting pipe are in sealed connection; a water outlet hole is formed in the activated carbon penetrating the activated carbon axially; and an upper end of the water outlet hole is closed.

In the composite filter-cartridge according to the present disclosure, with the pretreatment filter-cartridge, the fine filtration filter-cartridge and the activated carbon filter-cartridge constituted as a whole, tap water can pass through the pretreatment filter-cartridge, the fine filtration filter-cartridge and the activated carbon filter-cartridge sequentially to be filtered layer by layer, so that the quality of outflow water is guaranteed and the composite filter-cartridge has a smaller volume, thus realizing consistency of service lives of various filtering layers, so as to reduce the amount of work for changing the filter cartridge. Meanwhile, the composite filter-cartridge is formed to be a substantially cylindrical shape, which has higher filtering efficiency and can realize high water flux. In addition, the second water collecting pipe has a function of protecting the activated carbon.

In addition, the composite filter-cartridge according to the present disclosure may have the following technical features.

According to an embodiment of the present disclosure, a sealing and plugging element is fitted over the upper end of the activated carbon, the sealing and plugging element seals and plugs the upper end of the water outlet hole, and an outer circumferential wall of the sealing and plugging element and the inner circumferential wall of the second water collecting pipe are spaced apart from each other; or the upper end of the activated carbon extends to the separating plate, and the separating plate seals and plugs the upper end of the water outlet hole.

According to an embodiment of the present disclosure, a mounting plate extending outwards is provided at the lower end of the second water collecting pipe, the mounting plate and an inner circumferential wall of the pretreatment filter-cartridge are spaced apart from each other to define a water drain opening, and the fine filtration filter-cartridge is located above the mounting plate.

According to an embodiment of the present disclosure, at least one guiding groove communicated with the water drain opening is formed in an upper surface of the mounting plate.

According to an embodiment of the present disclosure, a plurality of guiding grooves are provided, all of the plurality of the guiding grooves are straight grooves and disposed in parallel with each other, and two ends of each guiding groove penetrate an outer circumferential wall of the mounting plate; or the plurality of the guiding grooves are spaced apart along a circumferential direction of the mounting plate, and each guiding groove extends along an radial direction of the mounting plate and penetrates the outer circumferential wall of the mounting plate.

According to an embodiment of the present disclosure, lower ends of the first water collecting pipe and the second water collecting pipe are connected via a thread structure, at least one sealing ring is disposed above the thread structure, and the sealing ring is located between the inner circumferential wall of the first water collecting pipe and the outer circumferential wall of the second water collecting pipe.

According to an embodiment of the present disclosure, an accommodating groove configured to accommodate the sealing ring is formed in at least one of the inner circumferential wall of the first water collecting pipe and the outer circumferential wall of the second water collecting pipe.

According to an embodiment of the present disclosure, a conduit is disposed at a bottom of the activated carbon, the conduit is communicated with the water outlet hole, and the conduit is in sealed connection with the second water collecting pipe.

The composite filter-cartridge assembly according to a second aspect of the present disclosure includes a filter container having an open top; a filter cover disposed to the top of the filter container, an accommodating space being defined between the filter cover and the filter container; and a composite filter-cartridge according to the first aspect of the present disclosure. The composite filter-cartridge is detachably disposed in the accommodating space, an outer circumferential wall of an upper end of the composite filter-cartridge is in sealed connection with an inner circumferential wall of the filter container, and a lower end of the pretreatment filter-cartridge of the composite filter-cartridge is in sealed connection with an inner wall of the filter container.

The water purifier according to a third aspect of the present disclosure includes the composite filter-cartridge assembly according to the second aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

REFERENCE NUMERALS

Figure 1:
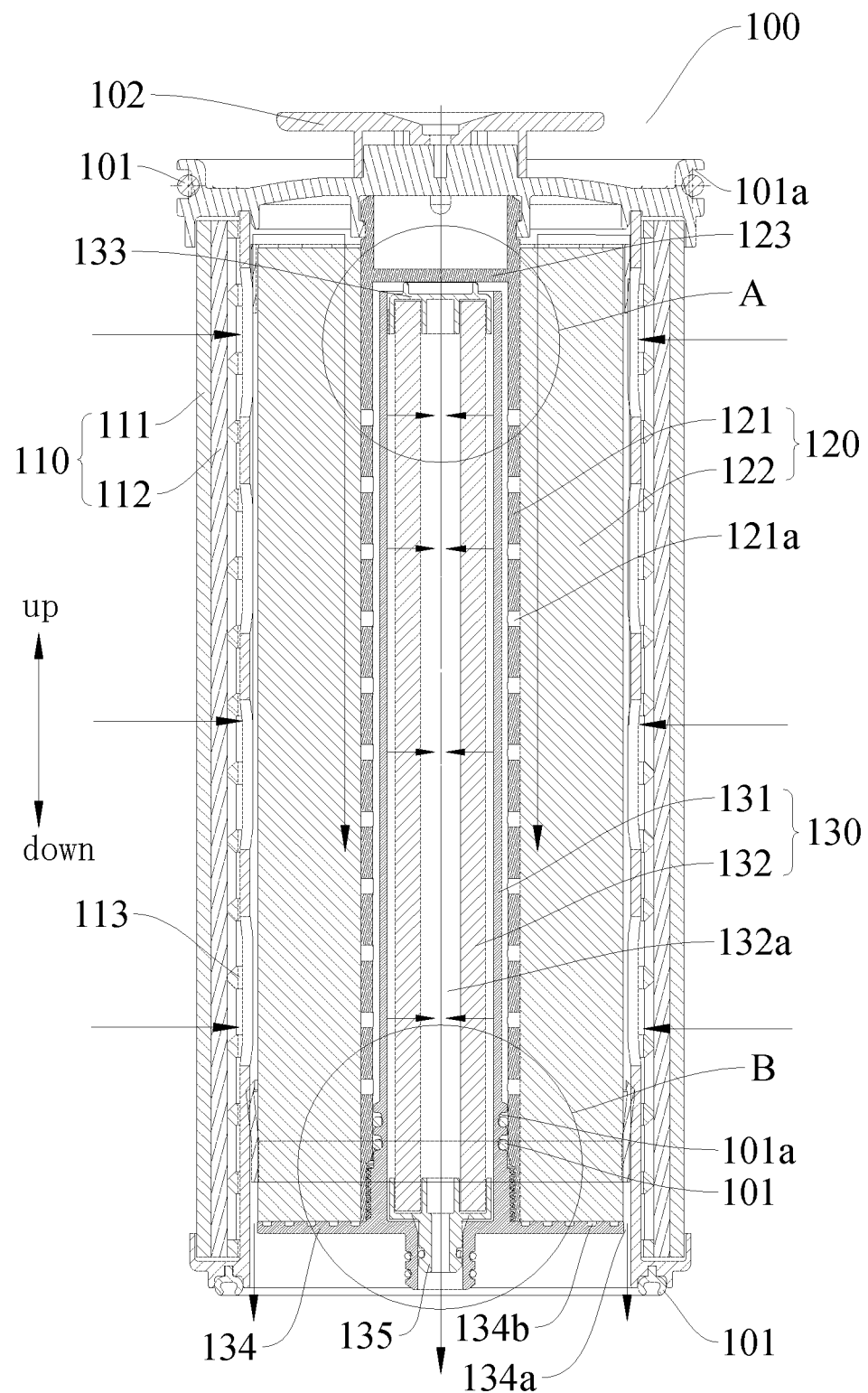
FIG. 1 is a sectional view of a composite filter-cartridge according to an embodiment of the present disclosure.

100: composite filter-cartridge; 101: sealing ring; 101a: accommodating groove; 102: handle; 103: sealing rubber cup;
110: pretreatment filter-cartridge; 120: fine filtration filter-cartridge; 130: activated carbon filter-cartridge;
111: first pretreatment filter-cartridge layer; 112: second pretreatment filter-cartridge layer; 113: framework;
121: first water collecting pipe; 121a: water collecting hole; 122: fine filtration membrane; 123: separating plate;
131: second water collecting pipe; 132: activated carbon; 132a: water outlet hole; 133: sealing and plugging element; 133a: abutment rib; 134: mounting plate; 134a: water drain opening; 134b: guiding groove; 135: conduit; 136: extension pipe.

DETAILED DESCRIPTION

Embodiments of the present disclosure will be described in detail and examples of the embodiments will be illustrated in the accompanying drawings. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial direction," "radial direction," and should be construed to refer to the orientation as then described or as shown in the drawings under discussion. These relative terms are for convenience of description and do not require that the present invention be constructed or operated in a particular orientation, thus cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the description of the present disclosure, it should be understood that, unless specified or limited otherwise, the terms "mounted," "connected," and "coupled" should be construed broadly, and may be, for example, fixed connections, detachable connections, or integral connections; may also be direct connections or indirect connections via intervening structures; may also be inner communications of two elements, which can be understood by those skilled in the art according to specific situations.

A composite filter-cartridge 100 according to embodiments of the first aspect of the present disclosure will be described with reference to FIG. 1 to FIG. 3.

Figure 2:
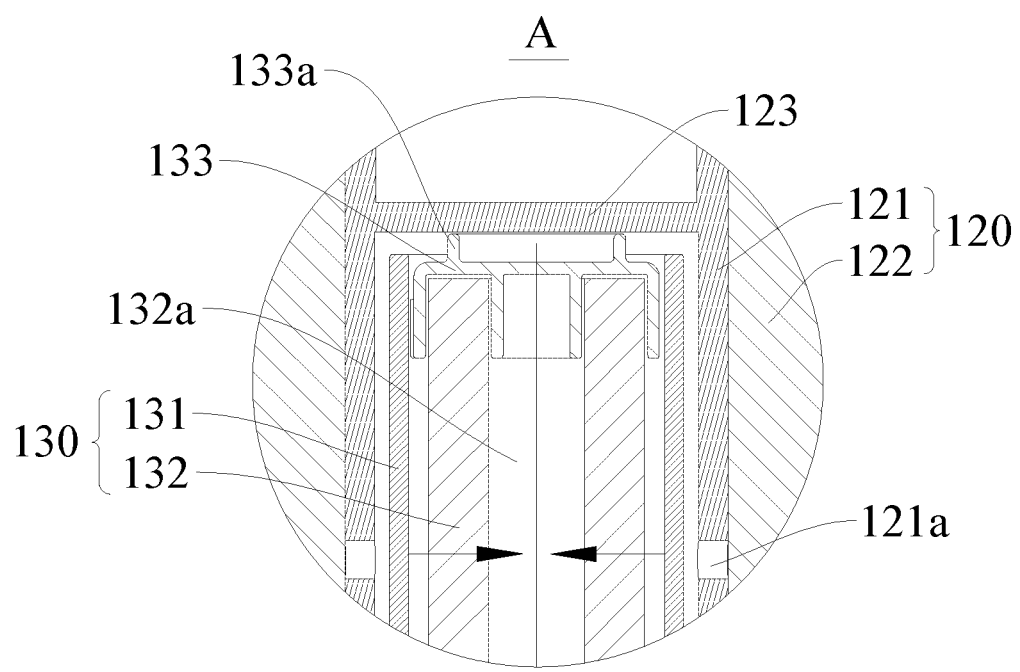
FIG. 2 is an enlarged view of portion A circled in FIG. 1.
Figure 3:
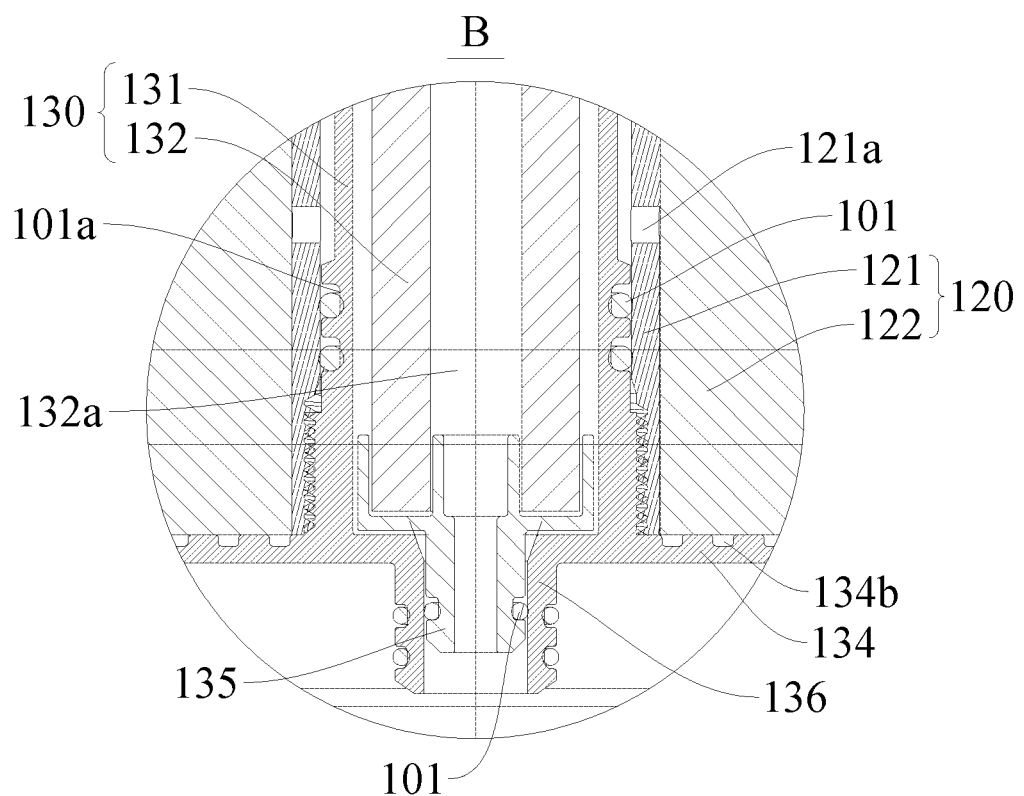
FIG. 3 is an enlarged view of portion B circled in FIG. 1.

As shown in FIG. 1 to FIG. 3, the composite filter-cartridge 100 according to embodiment of the first aspect of the present disclosure includes a pretreatment filter-cartridge 110, a fine filtration filter-cartridge 120 and an activated carbon filter-cartridge 130 arranged sequentially from outside to inside. The composite filter-cartridge 100 means that the pretreatment filter-cartridge 110, the fine filtration filter-cartridge 120 and the activated carbon filter-cartridge 130 are combined in one filter cartridge.

The fine filtration filter-cartridge 120 includes a first water collecting pipe 121 and a fine filtration membrane 122. A plurality of water collecting holes 121a are formed in a side wall of the first water collecting pipe 121, the fine filtration membrane 122 is fitted over the outside of the first water collecting pipe 121 and covers the plurality of water collecting holes 121a, and a separating plate 123 is provided to an upper portion of the first water collecting pipe 121.

The activated carbon filter-cartridge 130 is disposed inside the first water collecting pipe 121, and the activated carbon filter-cartridge 130 includes a second water collecting pipe 131 and activated carbon 132. A second water collecting pipe 131 is disposed inside the first water collecting pipe 121; an upper end face of the second water collecting pipe 131 and a lower surface of the separating plate 123 are spaced apart from each other, and an outer circumferential wall of the second water collecting pipe 131 except a lower end thereof and an inner circumferential wall of the first water collecting pipe 121 are spaced apart from each other; respective lower ends of the second water collecting pipe 131 and the first water collecting pipe 121 are in sealed connection. The activated carbon 132 is disposed inside the second water collecting pipe 131; an outer circumferential wall of the activated carbon 132 except a lower end thereof and an inner circumferential wall of the second water collecting pipe 131 are spaced apart from each other; respective lower ends of the activated carbon 132 and the second water collecting pipe 131 are in sealed connection. A water outlet hole 132a is formed in the activated carbon 132 penetrating the activated carbon 132 axially, and an upper end of the water outlet hole 132a is closed.

For example, as shown in FIG. 1 to FIG. 3, the pretreatment filter-cartridge 110, the fine filtration filter-cartridge 120 and the activated carbon filter-cartridge 130 constitute the integral composite filter-cartridge 100. Tap water can flow through the pretreatment filter-cartridge 110, the fine filtration filter-cartridge 120 and the activated carbon filter-cartridge 130 sequentially from outside to inside to be filtered layer by layer, so that the quality of outflow water is guaranteed and a volume of the composite filter-cartridge 100 is small. The composite filter-cartridge 100 is formed to be a substantially cylindrical shape, and the tap water can be filtered inwards through the whole outer circumferential surface of the pretreatment filter-cartridge 110, such that a filtering area is larger and filtering efficiency is higher, and in addition, water flux of the composite filter-cartridge 100 can be increased so as to increase the water yield, thus realizing high water flux of the composite filter-cartridge 100. In addition, the second water collecting pipe 131 is disposed between the fine filtration filter-cartridge 120 and the activated carbon 132, which can change a direction of the pure water radially flowing out from the fine filtration filter-cartridge 120, thus reducing an impact of the pure water on the activated carbon 132 so as to protect the activated carbon 132.

Specifically, the tap water can flow into an interior of the composite filter-cartridge 100 from outside to inside along a radial direction of the composite filter-cartridge 100. The tap water first flows inwards from the pretreatment filter-cartridge 110 into the fine filtration filter-cartridge 120 along the radial direction, the pretreatment filter-cartridge 110 can remove rust and silt in the tap water effectively and absorb the abnormal color, odor, residual chlorine and a part of the organics, to ensure the quality of water entering the fine filtration filter-cartridge 120 and hence prolong the service life of the fine filtration filter-cartridge 120. Then, the pure water after filtration of the fine filtration filter-cartridge 120 flows into a gap between the first water collecting pipe 121 and the second water collecting pipe 131 through the plurality of water collecting holes 121a in the first water collecting pipe 121, in which the water collecting hole 121a is able to adjust the water flow rate appropriately. As the lower end of the second water collecting pipe 131 is in sealed connection with the first water collecting pipe 121, the water level in the above gap rises increasingly until the water level arrives the upper end of the second water collecting pipe 131. The upper end of the water outlet hole 132a of the activated carbon 132 is closed, so that the water flow can flow into a gap between the second water collecting pipe 131 and the activated carbon 132 from up to down. As the lower end of the activated carbon 132 is in sealed connection with the second water collecting pipe 131, the water flow must pass through the activated carbon 132 to enter the water outlet hole 132a therein. The activated carbon 132 can remove VOC (an abbreviation of volatile organic compounds), the residual chlorine and organic matters in the water and keep the necessary minerals for example trace calcium, silicic acid, carbonate and the like to make the outflow water taste sweet and soft. The water enters the water outlet hole 132a after being filtered by the activated carbon 132 and flows out from a lower end of the water outlet hole 132a to make it convenient for a user to drink.

The pretreatment filter-cartridge 110 may be PAC (i.e. an abbreviation of polyaluminium chloride, also called a water purifying agent or a coagulant), so that the service life of the pretreatment filter-cartridge 110 can be increased up to one year. The pretreatment filter-cartridge 110 may include a first pretreatment filter-cartridge layer 111 and a second pretreatment filter-cartridge layer 112 sequentially arranged from outside to inside. The first pretreatment filter-cartridge layer 111 may be a PP (i.e. an abbreviation of polypropylene) non-woven winding layer, and the PP non-woven winding layer has a filter fineness of 5 μm so at to guarantee the filtering effect. The second pretreatment filter-cartridge layer 112 may be an activated carbon fiber winding layer. It could be understood that, the thickness of the pretreatment filter-cartridge 110 can be set according to the different regions and in combination with the different water quality so as to satisfy the requirements of the user for the purified water quality. The fine filtration filter-cartridge 120 may adopt a multi-membrane rolling process, i.e. the fine filtration filter-cartridge 120 is formed by rolling the fine filtration membrane 122 around the first water collecting pipe 121, so that the utilization rate of the fine filtration membrane 122 can be improved maximally. The fine filtration membrane 122 may be a RO membrane, but is not limited to this. The activated carbon 132 may adopt a coconut shell activated carbon, so that a natural taste factor can be kept and microelements can be adjusted when the water is filtered, thus adjusting the outflow water taste and satisfying the user requirement better.

In the composite filter-cartridge 100 according to embodiments of the present disclosure, with the pretreatment filter-cartridge 110, the fine filtration filter-cartridge 120 and the activated carbon filter-cartridge 130 arranged sequentially from outside to inside and constituted as a whole, the tap water can pass through the pretreatment filter-cartridge 110, the fine filtration filter-cartridge 120 and the activated carbon filter-cartridge 130 sequentially to be filtered layer by layer, so that the quality of the outflow water is guaranteed and the taste of the outflow water can be adjusted. The filtering area of the composite filter-cartridge 100 is larger and the filtering efficiency is higher, thus realizing the high water flux. In addition, the second water collecting pipe 131 is disposed between the fine filtration filter-cartridge 120 and the activated carbon 132, which can reduce the impact of the pure water on the activated carbon 132 so as to protect the activated carbon 132. The composite filter-cartridge 100 has a smaller volume, and realizes consistency of service lives of various filtering materials in the composite filter-cartridge 100 so that the amount of work for replacing filter cartridges is reduced and the use cost for the user is reduced.

In some optional embodiments of the present disclosure, as shown in FIG. 1 to FIG. 2, a sealing and plugging element 133 is fitted over an upper end of the activated carbon 132, the sealing and plugging element 133 seals and plugs the upper end of the water outlet hole 132a, and an outer circumferential wall of the sealing and plugging element 133 and the inner circumferential wall of the second water collecting pipe 131 are spaced apart from each other; or the upper end of the activated carbon 132 extends to the separating plate 123, and the separating plate 123 seals and plugs the upper end (not shown in the figures) of the water outlet hole 132a. Thus, no matter which of the above sealing and plugging manners, it is possible that the pure water between the first water collecting pipe 121 and the second water collecting pipe 131 cannot flow into the water outlet hole 132a of the activated carbon 132 directly but flow into the gap between the second water collecting pipe 131 and the activated carbon 132 from up to down, and then flows out from the water outlet hole 132a after being filtered by the activated carbon 132 to be provided for drinking, thus guaranteeing the outflow water taste. Meanwhile, as an upper portion of the activated carbon 132 may function to purify the water, so that the utilization rate of the activated carbon 132 is improved. For example, as shown in FIG. 1 to FIG. 2, the activated carbon 132 may be a cylindrical structure, a circular groove recessed upwards is formed in a bottom surface of the sealing and plugging element 133, and the circular groove may be fitted with the upper end of the activated carbon 132, so that the positioning of the sealing and plugging element 133 in a plane perpendicular to an up and down direction is guaranteed and the sealing effect of the sealing and plugging element 133 on the upper end of the water outlet hole 132a is guaranteed.

Optionally, the upper end of the sealing and plugging element 133 may basically abut against the lower surface of the separating plate 123 (For example, as shown in FIG. 2, an abutment rib 133a extending upwards may be provided on the upper end of the sealing and plugging element 133), or a smaller gap may be left between the upper end of the sealing and plugging element 133 and the lower surface of the separating plate 123 so as to position the activated carbon 132 in the up and down direction and prevent an outer circumferential wall of the upper end of the activated carbon 132 from contacting the inner circumferential wall of the second water collecting pipe 131.

In a further embodiment of the present disclosure, a mounting plate 134 extending outwards is provided at the lower end of the second water collecting pipe 131, the mounting plate 134 and an inner circumferential wall of the pretreatment filter-cartridge 110 are spaced apart from each other to define a water drain opening 134a. The fine filtration filter-cartridge 120 is located above the mounting plate 134. For example, as shown in FIG. 1, the mounting plate 134 may extend outwards horizontally along the radial direction to be opposite to the outer circumferential wall of the fine filtration filter-cartridge 120 along the up and down direction, so that the cleanness of the fine filtration filter-cartridge 120 is guaranteed effectively and hence the outflow water quality is guaranteed. In addition, as the fine filtration filter-cartridge 120 is invisible from the appearance of the whole composite filter-cartridge 100, the whole composite filter-cartridge 100 has a more aesthetic appearance. A circular water drain opening 134a, i.e. a waste water drain opening, is defined between the mounting plate 134 and the inner circumferential wall of the pretreatment filter-cartridge 110. The waste water filtered out by the fine filtration filter-cartridge 120 can flow out downwards from the water drain opening 134a, such that not only the requirements of the user for the outflow water quality is satisfied, but also the collection of the waste water is realized to protect the environment.

Furthermore, at least one guiding groove 134b communicated with the water drain opening 134a is formed in an upper surface of the mounting plate 134. For example, as shown in FIG. 1 and FIG. 3, a plurality of the guiding grooves 134b may be formed by recessing a part of the upper surface of the mounting plate 134 downwards, and each of the guiding grooves 134b is communicated with the water drain opening 134a. Thus, as the guiding groove 134b is located right below the fine filtration filter-cartridge 120, the waste water can fall into the guiding groove 134b from the bottom of the fine filtration filter-cartridge 120, and be discharged from the water drain opening 134a under a guiding function of the guiding groove 134b. Moreover, when the bottom of the fine filtration filter-cartridge 120 contacts the upper surface of the mounting plate 134, as the upper surface of the mounting plate 134 is provided with the guiding groove 134b, the discharge of the waste water will not be influenced.

Optionally, the plurality of guiding grooves 134b are provided, as shown in FIG. 1 and FIG. 3, all of the plurality of the guiding grooves 134b are straight grooves and disposed in parallel with each other, and two ends of each guiding groove 134b penetrate an outer circumferential wall of the mounting plate 134, so that the processing is simple and the cost is low. In addition, as respective outer ends of the plurality of the guiding grooves 134b penetrate the outer circumferential wall of the mounting plate 134, it is guaranteed that the guiding groove 134b is in communication with the water drain opening 134a to facilitate the discharge of waste water. Certainly, the present disclosure is not limited to this, the plurality of the guiding grooves 134b may be spaced apart along a circumferential direction of the mounting plate 134, and each guiding groove 134b extends along an radial direction of the mounting plate 134 and penetrates the outer circumferential wall (not shown) of the mounting plate 134, thus realizing a guiding effect on the waste water as well.

As shown in FIG. 1 and FIG. 3, lower ends of the first water collecting pipe 121 and the second water collecting pipe 131 are connected via a thread structure, at least one sealing ring 101 is disposed above the thread structure, and the sealing ring 101 is located between the inner circumferential wall of the first water collecting pipe 121 and the outer circumferential wall of the second water collecting pipe 131. Thus, connection strength and sealing property between the first water collecting pipe 121 and the second water collecting pipe 131 is guaranteed by providing the thread structure, and the sealing property between the first water collecting pipe 121 and the second water collecting pipe 131 is further guaranteed by providing the sealing ring 101, so that the water entering between the first water collecting pipe 121 and the second water collecting pipe 131 through the fine filtration filter-cartridge 120 can continue to flow inwards into the activated carbon filter-cartridge 130, thus improving the water purification efficiency. Moreover, the sealing is performed in the manner of adopting the above thread structure in combination with the sealing ring 101, which has a simple structure, low cost and reliable sealing.

Preferably, an accommodating groove 101a configured to accommodate the sealing ring 101 is formed in at least one of the inner circumferential wall of the first water collecting pipe 121 and the outer circumferential wall of the second water collecting pipe 131. That is, the accommodating groove 101a configured to accommodate the sealing ring 101 may be only formed in the inner circumferential wall of the first water collecting pipe 121, or the accommodating groove 101a configured to accommodate the sealing ring 101 may be only formed in the outer circumferential wall of the second water collecting pipe 131, or the accommodating groove 101a configured to accommodate the sealing ring 101 is formed in each of the inner circumferential wall of the first water collecting pipe 121 and the outer circumferential wall of the second water collecting pipe 131. For example, as shown in FIG. 1 and FIG. 3, the accommodating groove 101a configured to accommodate the sealing ring 101 is formed in the outer circumferential wall of the second water collecting pipe 131, the accommodating groove 101a has a function of positioning the sealing ring 101, which can prevent the sealing ring 101 from moving due to the impact of the water when in use or in the assembling process, so that the sealing property between the first water collecting pipe 121 and the second water collecting pipe 131 is further guaranteed.

It could be understood, in order to guarantee the sealing property between the respective lower ends of the first water collecting pipe 121 and the second water collecting pipe 131, a plurality of sealing rings 101 may be disposed spaced apart in the up and down direction between the lower ends of the first water collecting pipe 121 and the second water collecting pipe 131. For example, two sealing rings 101 are shown in FIG. 1 and FIG. 3 for explanatory illustration. After reading the following technical solution, those ordinarily skilled can apparently understand that the present solution can be applied to technical solutions where three or more sealing rings 101 are provided, which also fall into the protection scope of the present disclosure. Certainly, on the premise that the sealing property between the lower end of the first water collecting pipe 121 and the lower end of the second water collecting pipe 131 is guaranteed, it is also possible to dispose only one sealing ring 101 between lower ends of the first water collecting pipe 121 and the second water collecting pipe 131 so as to save the cost.

In a further embodiment of the present disclosure, a conduit 135 is disposed at a bottom of the activated carbon 132, the conduit 135 is communicated with the water outlet hole 132a, and the conduit 135 is in sealed connection with the second water collecting pipe 131. For example, as shown in FIG. 1 and FIG. 3, a through hole penetrating the conduit 135 along the axial direction is formed in the conduit 135, the through hole is communicated with the water outlet hole 132a, and the conduit 135 may be in sealed connection with the lower end of the second water collecting pipe 131, so that the water between the second water collecting pipe 131 and the activated carbon is prevented from flowing out from a gap between the conduit 135 and the second water collecting pipe 131 directly, it is guaranteed that the water can only flow out from the above through hole for the user to drink after being filtered by the activated carbon 132 and passing through the water outlet hole 132a. Optionally, a size of a cross section of the above through hole is smaller than a size of a cross section of the water outlet hole 132a, so that the water purified by the activated carbon 132 is able to flow out gently under a guiding function of the conduit 135, thus the quality of the outflow water is guaranteed.

As shown in FIG. 3, a circular groove recessed downwards is formed in an upper end of the conduit 135, the lower end of the activated carbon 132 is configured to be fitted in the circular groove, which not only guarantees sealing property between the activated carbon 132 and the conduit 135, but also facilitates the assembly of the activated carbon 132 and the conduit 135, improving the assembling efficiency. An extension pipe 136 extending downwards is disposed to a lower surface of the mounting plate 134 to facilitate the connection with a water outlet pipeline. An extending portion extending downwards is provided at a lower end of the conduit 135, and the extending portion extends into the extension pipe 136 and is communicated with the water outlet hole 132a so as to lead the pure water filtered by the activated carbon 132 out. The extending portion and the extension pipe 136 are in sealed connection. For example, as shown in FIG. 3, the sealing ring 101 is disposed between an outer circumferential wall of the extending portion and an inner circumferential wall of the extension pipe 136 so as to seal a gap between the extending portion and the extension pipe 136.

Further, a framework 113 may be disposed between an outer wall face of the fine filtration filter-cartridge 120 and an inner wall face of the pretreatment filter-cartridge 110. A plurality of perforated holes are formed in the framework 113 so that the water filtered by the pretreatment filter-cartridge 110 can pass through the plurality of perforated holes and flow towards the fine filtration filter-cartridge 120, thus facilitating the mounting of the pretreatment filter-cartridge 110 and realizing pressurized filtration of the composite filter-cartridge 100, i.e. the pressurized tap water flows into the composite filter-cartridge 100 from outside to inside along the radial direction. The framework 113 can bear a certain pressure so that stability of the composite filter-cartridge 100 in the process of filtering the tap water is guaranteed.

Optionally, a sealing rubber cup 103 may be disposed between the lower end of the fine filtration filter-cartridge 120 and the inner wall face of the pretreatment filter-cartridge 110, so that the sealing property of the composite filter-cartridge 100 is guaranteed and a residual volume of water in the composite filter-cartridge 100 is reduced effectively, thus guaranteeing the quality of the outflow water and satisfying the requirements of the user better.

A composite filter-cartridge assembly for a water purifier according to embodiments of the second aspect of the present disclosure includes a filter container (not shown in the figures), a filter cover (not shown in the figures) and the composite filter-cartridge 100 according to embodiments of the first aspect of the present disclosure.

A top of the filter container is open, and the filter cover is disposed at the top of the filter container so as to open or close the opening in the top of the filtering container. An accommodating space is formed between the filter cover and the filter container and the composite filter-cartridge 100 is detachably disposed in the accommodating space. An outer circumferential wall of an upper end of the composite filter-cartridge 100 is in sealed connection with an inner circumferential wall of the filter container, and a lower end of the pretreatment filter-cartridge 110 of the composite filter-cartridge 100 is in sealed connection with an inner wall of the filter container. For example, as shown in FIG. 1, a handle 102 is fitted over the upper end of the composite filter-cartridge 100 so as to facilitate removal of the composite filter-cartridge 100 from the filtering container. The sealing ring 101 may be disposed to an outer circumferential wall of the handle 102 so as to seal a gap between inner walls of an upper portion of the composite filter-cartridge 100 and an upper portion of the filter container and prevent the water from overflowing from the gap between the filter container and the composite filter-cartridge 100. Similarly, a sealed connection between a bottom face of the pretreatment filter-cartridge 110 and a bottom wall of the filtering container can also be realized by means of the sealing ring 101 so as to separate the waste water from the unpurified tap water, thus guaranteeing the sealing between the composite filter-cartridge 100 and the filter container and hence guaranteeing the effect of water purification.

Optionally, the accommodating groove 101a configured to accommodate the sealing ring 101 may also be formed in the outer circumferential wall of the handle 102 and the lower end of the pretreatment filter-cartridge 110 so as to play a role in positioning the sealing ring 101.

In the composite filter-cartridge assembly for the water purifier according to embodiments of the present disclosure, with the above composite filter-cartridge 100, the volume of the composite filter-cartridge assembly is reduced, and service lives of the filtering materials in various stages are consistent, which cuts down the cost and is convenient for the user to replace the composite filter-cartridge 100. Meanwhile, it is possible to guarantee the quality of the outflow water, adjust the taste of the outflow water and realize the high water flux.

The water purifier according to embodiments of the third aspect of the present disclosure includes the composite filter-cartridge assembly according to the second aspect of the present disclosure.

In the water purifier according to embodiments of the present disclosure, with the above composite filter-cartridge assembly, a water purifying system in the water purifier has simple pipeline connection, a joint and a PE pipe (i.e. polyethylene pipe) for connecting the composite filter-cartridge 100 in the prior art are omitted, and a risk of water leakage is reduced. In addition, the outline dimension is smaller, which is beneficial for a miniaturized design, facilitates transportation and saves a kitchen space for the user. Meanwhile, it is possible to guarantee the quality of the outflow water, adjust the taste of the outflow water and realize the high water flux, which brings great convenience for the user.

Other constructions and operations of the water purifier according to the embodiments of the present disclosure are known to those ordinarily skilled in the related art, which will not be described in detail here.

Reference throughout this specification to "an embodiment," "some embodiments," "illustrative embodiment," "an example," "a specific example," or "some examples," means that a particular feature, structure, material, or characteristic described in connection with the embodiment or example is included in at least one embodiment or example of the present disclosure. Thus, the illustrative expressions of the terms above throughout this specification are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be appreciated by those skilled in the art that changes, variation, alternatives, and modifications can be made in the embodiments without departing from the principle and spirit of the present disclosure, and the scope of the present disclosure is defined by the claims and its equivalents.

What is claimed is:
1. A composite filter-cartridge, comprising:
a pretreatment filter-cartridge, a fine filtration filter-cartridge and an activated carbon filter-cartridge arranged sequentially from outside to inside,
the fine filtration filter-cartridge comprising a first water collecting pipe and a fine filtration membrane, a plurality of water collecting holes being formed in a side wall of the first water collecting pipe, the fine filtration membrane being fitted over an outside of the first water collecting pipe and covering the plurality of water collecting holes, a separating plate being provided inside an upper portion of the first water collecting pipe, and the activated carbon filter-cartridge being disposed inside the first water collecting pipe; and
the activated carbon filter-cartridge comprising:
a second water collecting pipe disposed inside the first water collecting pipe, an upper end face of the second water collecting pipe and a lower surface of the separating plate being spaced apart from each other, an outer circumferential wall of the second water collecting pipe except a lower end thereof and an inner circumferential wall of the first water collecting pipe being spaced apart from each other, and lower ends of the second water collecting pipe and the first water collecting pipe being in sealed connection; and
an activated carbon disposed inside the second water collecting pipe, an outer circumferential wall of the activated carbon except a lower end thereof and an inner circumferential wall of the second water collecting pipe being spaced apart from each other, lower ends of the activated carbon and the second water collecting pipe being in sealed connection, a water outlet hole being formed in the activated carbon and penetrating the activated carbon axially, and an upper end of the water outlet hole being closed.

2. The composite filter-cartridge according to claim 1, wherein a sealing and plugging element is fitted over the upper end of the activated carbon, the sealing and plugging element seals and plugs the upper end of the water outlet hole, and an outer circumferential wall of the sealing and plugging element and the inner circumferential wall of the second water collecting pipe are spaced apart from each other.

3. The composite filter-cartridge according to claim 1, wherein a mounting plate extending outwards is provided at the lower end of the second water collecting pipe, the mounting plate and an inner circumferential wall of the pretreatment filter-cartridge are spaced apart from each other to define a water drain opening, and the fine filtration filter-cartridge is located above the mounting plate.

4. The composite filter-cartridge according to claim 3, wherein at least one guiding groove communicated with the water drain opening is formed in an upper surface of the mounting plate.

5. The composite filter-cartridge according to claim 4, wherein a plurality of guiding grooves are formed in the upper surface of the mounting plate.

6. The composite filter-cartridge according to claim 1, wherein lower ends of the first water collecting pipe and the second water collecting pipe are connected via a thread structure, at least one sealing ring is disposed above the thread structure, and the sealing ring is located between the inner circumferential wall of the first water collecting pipe and the outer circumferential wall of the second water collecting pipe.

7. The composite filter-cartridge according to claim 6, wherein an accommodating groove configured to accommodate the sealing ring is formed in the outer circumferential wall of the second water collecting pipe.

8. The composite filter-cartridge according to claim 1, wherein a conduit is disposed at a bottom of the activated carbon, the conduit is communicated with the water outlet hole, and the conduit is in sealed connection with the second water collecting pipe.

\* \* \* \* \*